(12) United States Patent
Chang (10) Patent No.: US 8,403,369 B2
(45) Date of Patent: Mar. 26, 2013

(54) CONNECTOR FOR CONNECTING A TANK TRUCK TO AN UNDERGROUND OIL DEPOT

(76) Inventor: George Chang, Taipei (TW)

( * ) Notice: Subject to any disclaimer, the term of this patent is extended or adjusted under 35 U.S.C. 154(b) by 174 days.

(21) Appl. No.: 12/904,208

(22) Filed: Oct. 14, 2010

(65) Prior Publication Data
US 2012/0090701 A1 Apr. 19, 2012

(51) Int. Cl.
F16L 37/18 (2006.01)
E05B 3/00 (2006.01)
(52) U.S. Cl. ........ 285/311; 285/38; 285/312; 292/336.3
(58) Field of Classification Search .................. 285/312, 285/38, 311, 320; 292/336.3
See application file for complete search history.

(56) References Cited

U.S. PATENT DOCUMENTS 3,432,191 A * 3/1969 Ludeman ..................... 285/311
4,030,524 A * 6/1977 McMath et al. ......... 137/614.06
4,234,161 A * 11/1980 Wilder et al. .............. 251/149.9
4,575,130 A * 3/1986 Pemberton et al. ............. 285/38
6,062,609 A * 5/2000 Chauvire et al. .............. 285/326

* cited by examiner

Primary Examiner — James Hewitt
(74) Attorney, Agent, or Firm — Alan Kamrath; Kamrath IP Lawfirm, P.A.

(57) ABSTRACT

A connector for connecting a tank truck to an underground oil depot has a body, a handle, a transmission device and two locking arms. The body has a mounting tube and a connection tube respectively connected with an oil drain valve and an oil pipe. The handle is pivotally mounted on the body. The transmission device is pivotally connected to the handle and has a linking lever and two transmitting levers. The linking lever is pivotally connected to the handle, and the transmitting levers are pivotally and slidably connected to the linking lever. The locking arms are pivotally mounted on the mounting tube of the body, selectively extend into the mounting tube and are respectively connected securely to the transmitting levers. Each locking arm has a pushing protrusion mounted on the locking arm and is adapted to push against a joint on the oil drain valve.

12 Claims, 6 Drawing Sheets

CONNECTOR FOR CONNECTING A TANK TRUCK TO AN UNDERGROUND OIL DEPOT

BACKGROUND OF THE INVENTION

1. Field of the Invention

The present invention relates to a connector and, more particularly, to a depot connector for connecting a tank truck to an underground oil depot to provide an excellent sealing effect and to keep the connector from disengaging unintentionally from a joint of a valve during the oil-draining process.

2. Description of Related Art

To drain oil from a tank truck to an underground oil depot, an oil pipe is used and has two ends connected respectively with a drain connector and a depot connector. The depot connector is connected to an oil drain valve on the underground oil depot to discharge oil in the tank truck into the oil depot via the connectors and the oil pipe. To prevent oil leakage and a fire from occurring, an excellent sealing conjunction between the connectors and the valves is an important issue. Additionally, a conventional connector does not have a locking mechanism to keep the connector from disengaging from the valve unintentionally, so the conventional connector may be detached from the valve due to an external force or carelessness of an operator.

To overcome the shortcomings, the present invention provides a connector to mitigate or obviate the aforementioned problems.

SUMMARY OF THE INVENTION

The main objective of the invention is to provide a connector for connecting a tank truck to an underground oil depot to provide an excellent sealing effect and to keep the connector from disengaging unintentionally from an oil drain valve during the oil-draining process.

The connector has a body, a handle, a transmission device and two locking arms. The body has two ends, a mounting tube, a connection tube and a sealing ring. The mounting tube is formed on one end of the body and is adapted to connect to an oil drain valve mounted on an underground oil depot. The connection tube is mounted on the other end of the body and is adapted to connect to an oil pipe. The sealing ring is mounted in the mounting tube. The handle is pivotally mounted on the body. The transmission device is pivotally connected to the handle and has a linking lever and two transmitting levers. The linking lever has a first end pivotally connected to the handle and a second end. The transmitting levers are pivotally and slidably connected to the second end of the linking lever. The locking arms are pivotally mounted on the mounting tube of the body, selectively extend into the mounting tub; and are respectively connected securely to the transmitting levers. Each locking arm has a pushing protrusion mounted on the locking arm and is adapted to push against a joint on the oil drain valve.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
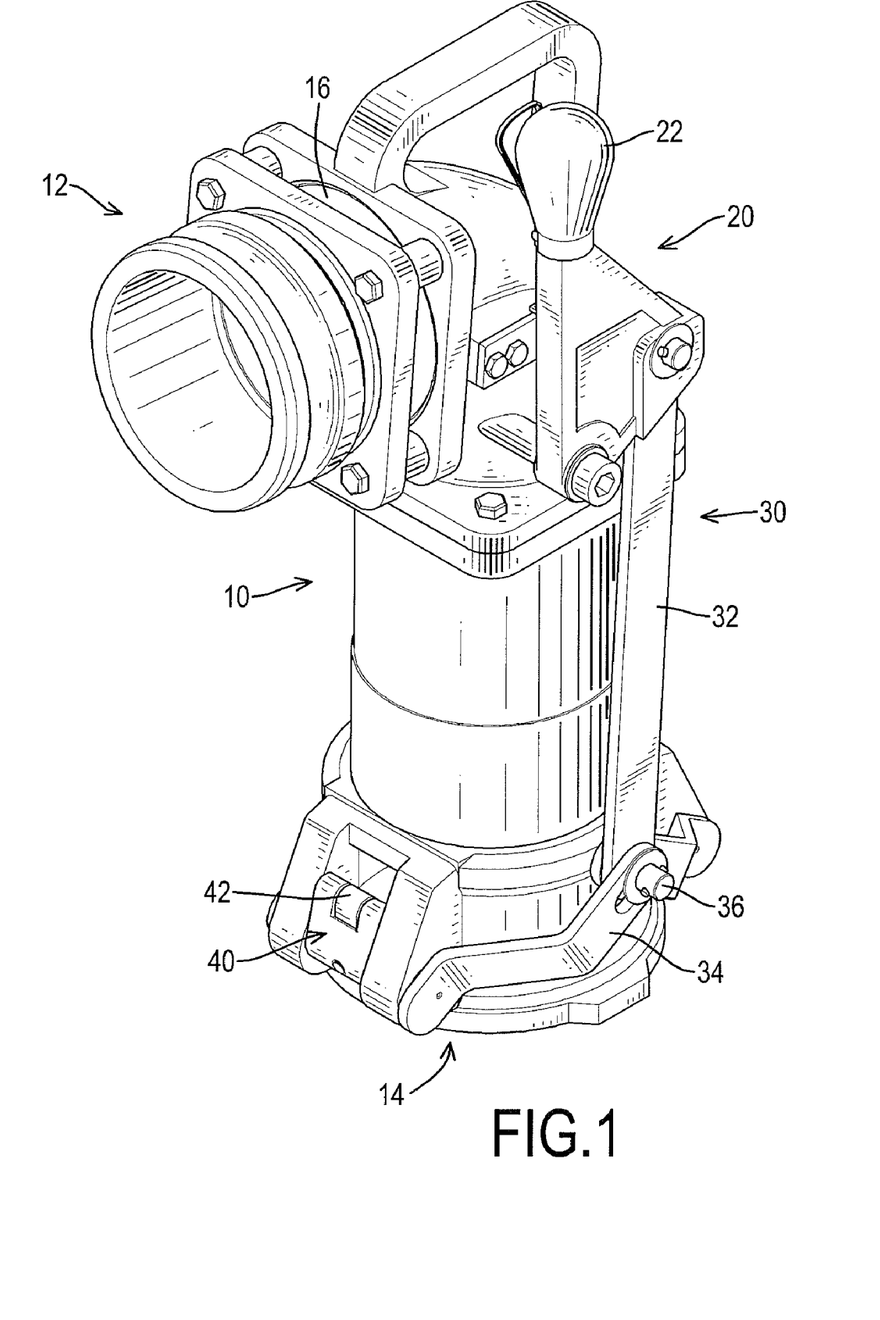
FIG. 1 is a perspective view of a connector in accordance with the present invention combined with a joint of the oil drain valve.
Figure 2:
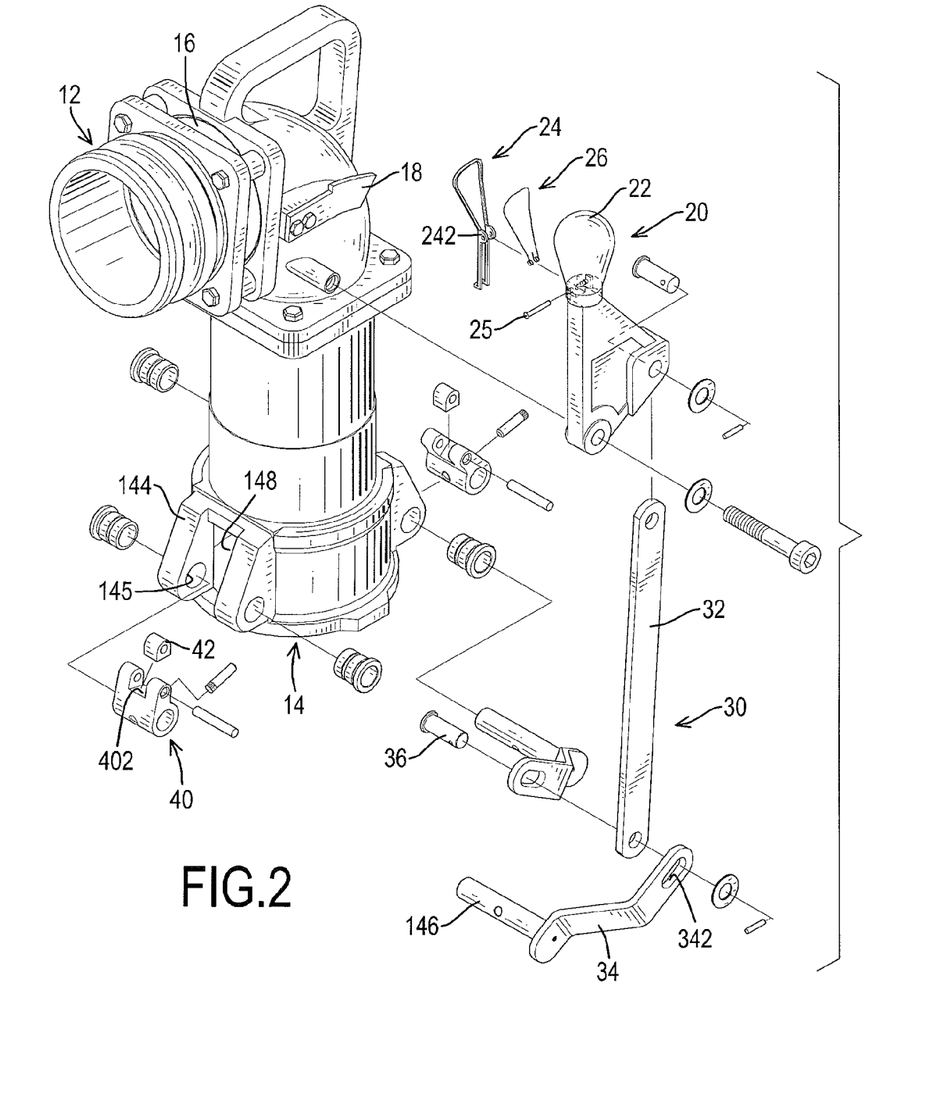
FIG. 2 is an exploded perspective view of the connector in FIG. 1.
Figures 3, 3A:
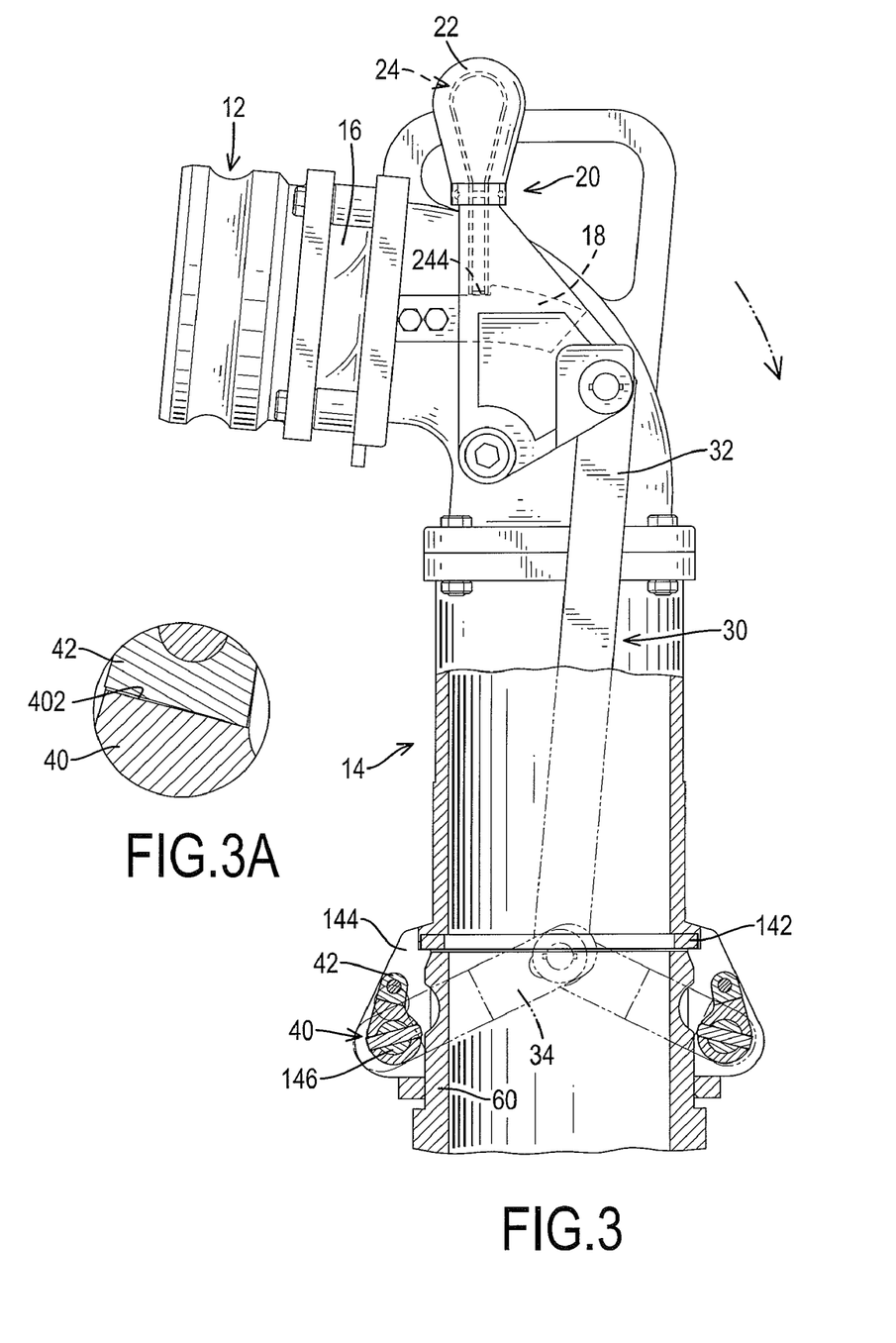
FIG. 3 is a side view in partial section of the connector in FIG. 1 in an uncombined condition.
FIG. 3A is an enlarged cross sectional side view of the connector in FIG. 3.

With reference to FIGS. 1 to 3, a connector in accordance with the present invention comprises a body 10, a handle 20, a transmission device 30, two locking arms 40 and a safety device.

Figure 4:
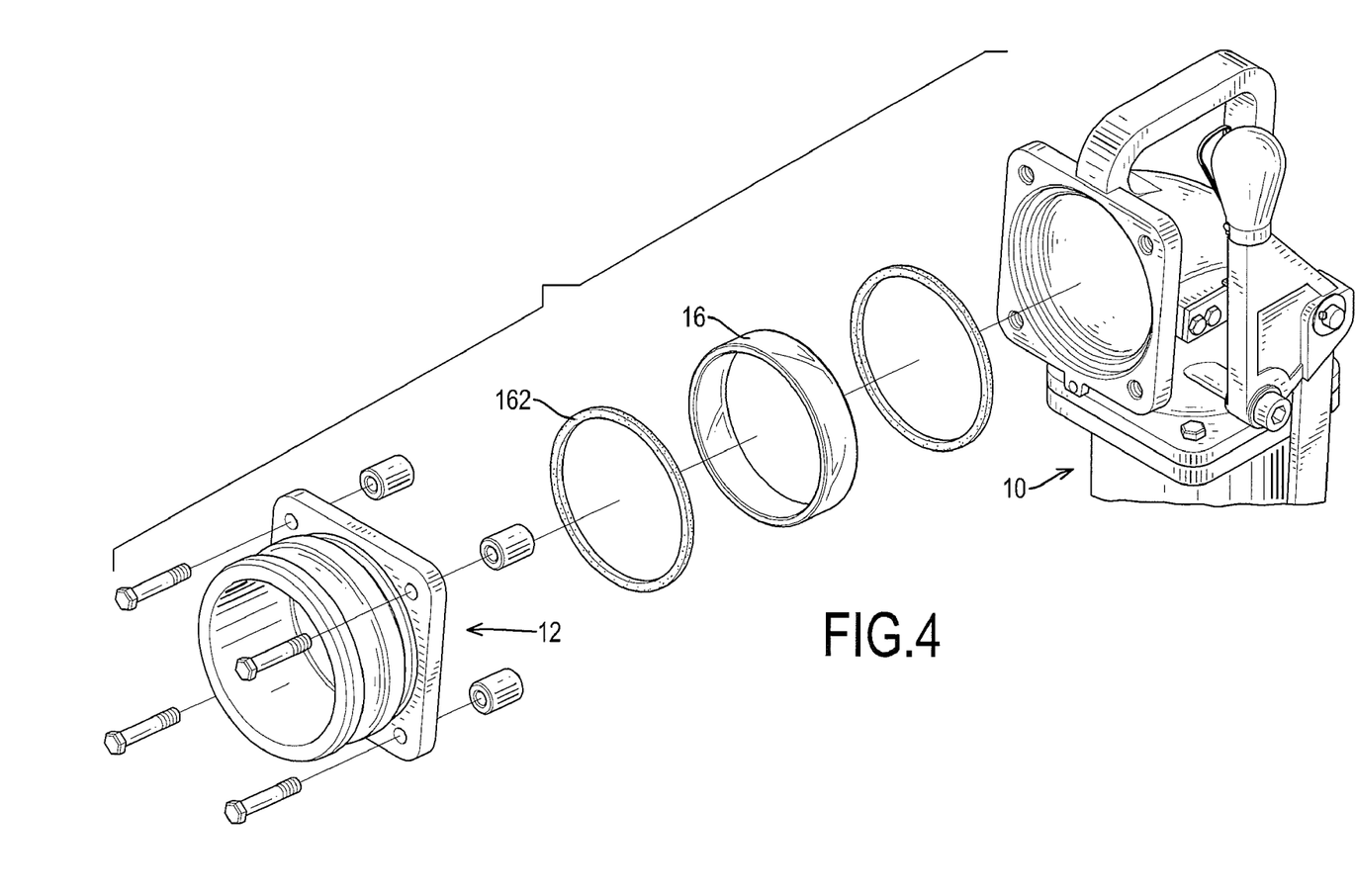
FIG. 4 is an exploded perspective view of the connection tube with the body of the connector in FIG. 1.

The body 10 may be L-shaped and has two ends, a mounting tube 14, a connection tube 12 and a sealing ring 142. The mounting tube 14 is formed on one end of the body 10 and is connected to an oil drain valve mounted on an underground oil depot. The connection tube 12 is mounted on the other end of the body 10 and is connected to an oil pipe connected to a tank truck. The connection tube 12 may be integrally formed on the end of the body 10. Alternatively, the connection tube 12 may be a separate part from the body 10 and is connected with the body 10 with fasteners. With further reference to FIG. 4, the body 10 may further have a transparent window tube 16 and two O-rings 162. The transparent window tube 16 is mounted between the connection tube 12 and the corresponding end of the body 10 and has two ends respectively connected to the end of the body 10 and the connection tube 12. The O-rings 162 are mounted respectively between the ends of the window tube 16 and the connection tube 12 and the corresponding end of the body 10. With the arrangement of the transparent window tube 16, the oil flow in the connector can be easily observed to keep the connector from being detached from the oil drain valve before the oil-draining process is completed. Oil leakage, industry accident and environment pollution can be prevented. The sealing ring 142 is mounted in the mounting tube 14.

The handle 20 is pivotally mounted on the body 10. Preferably, the handle 20 is pivotally mounted on the body 10 at a position adjacent to the connection tube 12 and has a triangular shape, a top and a grip 22 formed on and protruding from the top of the handle 20.

With the arrangement of the grip 22, a user can hold the grip 22 with one hand to pivot the handle 20 relative to the body 10.

The transmission device 30 is pivotally connected to the handle 20 and comprises a linking lever 32 and two transmitting levers 34. The linking lever 32 has a first end pivotally connected to the handle 20 and a second end. The transmitting levers 34 are pivotally and slidably connected to the second end of the linking lever 32. Preferably, each transmitting lever 34 has an elongated hole 342 defined through the transmitting lever 34. A sliding pin 36 is mounted slidably through the elongated holes 342 in the transmitting levers 34 and mounted through the second end of the linking lever 32 to slidably and pivotally connect the transmitting levers 34 with the linking lever 32.

The locking arms 40 are pivotally mounted on the mounting tube 14 of the body 10, selectively extend into the mounting tube 14, and are respectively connected securely to the transmitting levers 34. Preferably, the locking arms 40 are mounted respectively on two ends of a diameter of the mounting tube 14. In addition, the mounting tube 14 further has two pairs of pivotal ears 144 mounted respectively on the ends of the diameter of the mounting tube 14. Each pair of the pivotal ears 144 is separately formed on and protrudes from an outer surface of the mounting tube 14 and has two pivoting holes 145 defined respectively through the pair of the pivotal ears 144 and aligning with each other. Two pivotal rods 146 are respectively connected securely with the transmitting levers 34, are mounted respectively through the pivoting holes 145 in the pairs of the pivotal ears 144, and are respectively mounted securely through the locking aims 40. Accordingly, the locking arms 40 are mounted pivotally on the pivotal ears 144 and are connected securely with the transmitting levers 34 with the pivotal rods 146. The notches 148 are defined through the outer surface of the mounting tube 14 respectively between the pairs of the pivotal ears 144 to allow the locking arms 40 to extend into the mounting tube 14 via the notches 148.

Each locking arm 40 has a pushing protrusion 42 mounted on the locking arm 40 and is adapted to push against a joint 60 on the oil drain valve. Preferably, the pushing protrusion 42 may be integrally formed on the locking arm 40. Alternatively, the pushing protrusion 42 is pivotally mounted on the locking arm 40. To pivotally mount the pushing protrusion 42 on the locking auii 40, the locking arm 40 has a pivotal recess 402 defined in an edge of the locking arm 40, and the pivotal recess 402 has a bottom. The pushing protrusion 42 is pivotally mounted in the pivotal recess 402 in the locking arm 40 with a pivotal pin and has a bottom face and a gap defined between the bottom face of the pushing protrusion 42 and the bottom of the pivotal recess 402 as shown in FIG. 3A.

Figures 5, 5A:
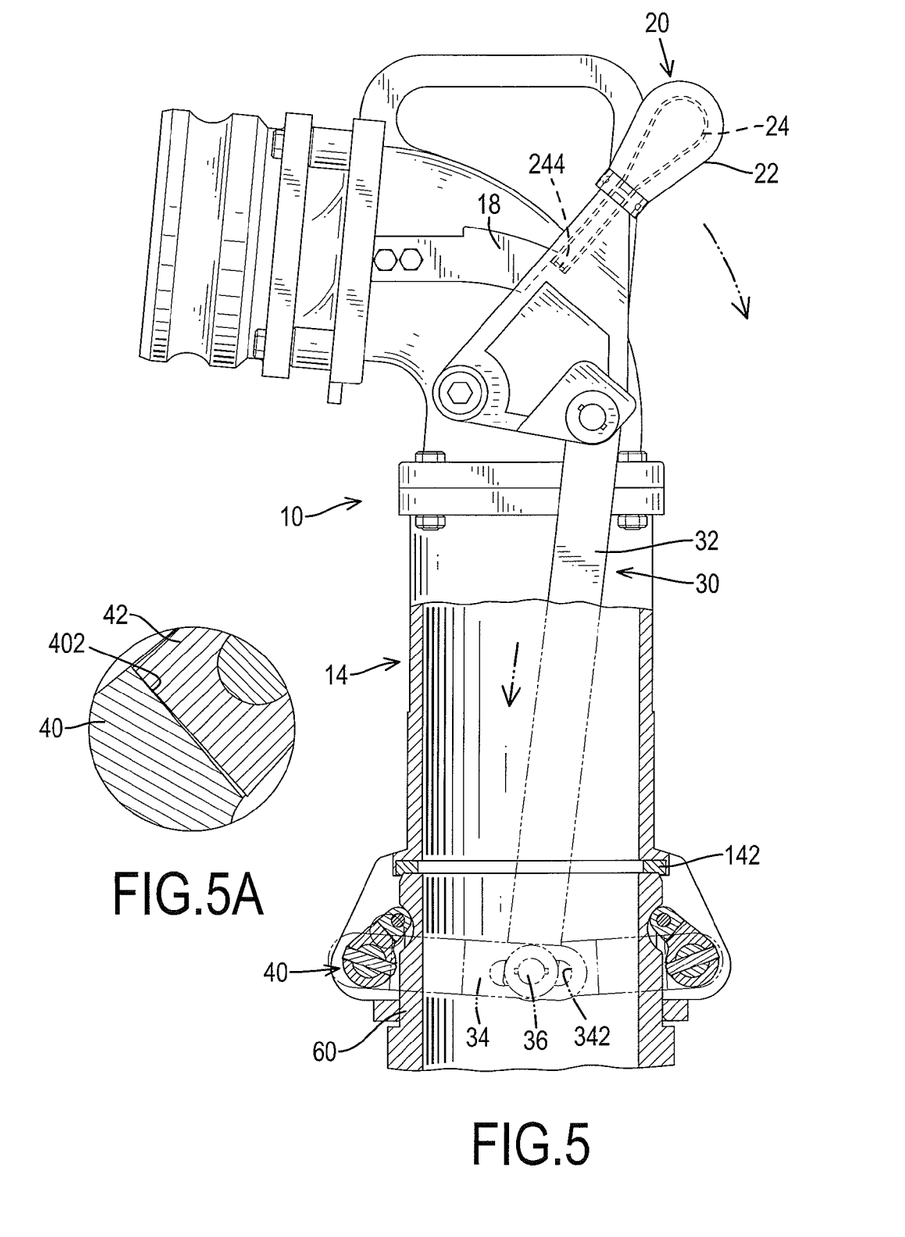
FIG. 5 is a side view in partial section of the connector in FIG. 1 combined with a joint of a valve.
FIG. 5A is an enlarged cross sectional side view of the connector in FIG. 5.

With reference to FIGS. 2, 3 and 5, to connect the connector with an oil drain valve mounted on an underground oil depot, the mounting tube 14 is mounted around a joint 40 of the valve. The handle 20 is then pivoted relative to the body 10, the linking lever 32 is moved downward, and the transmitting levers 34 are pivoted and slid relative to the linking lever 32, with the sliding pin 36 sliding along the elongated holes 342. Consequently, the locking arms 40 are pivoted relative to the body 10 and extend into the mounting tube 14 via the notches 148 with the transmission of the linking lever 32 and the transmitting levers 34 of the transmission device 30. The pushing protrusions 42 on the locking arms 40 can push against the joint 60 to move the body 10 further downward relative to the joint 60. Accordingly, joint 60 can firmly abut against the sealing ring 142 in the mounting tube 14, such that an excellent sealing effect can be provided to the conjunction between the connector and the valve to prevent oil leakage occurring during the oil-draining process.

With the pushing protrusions 42 pivotally mounted on the locking arms 40, the pushing protrusions 42 will slightly pivot relative to the locking arms 40 when the pushing protrusions 42 abut against the joint 60. With the abutment between the bottom faces of the pushing protrusions 42 and the bottoms of the pivotal recesses 402 in the locking arms is 40, a leverage effect is provided to push the joint 60 with the pushing protrusions 42, and a labor-saving effect is provided.

Figure 6:
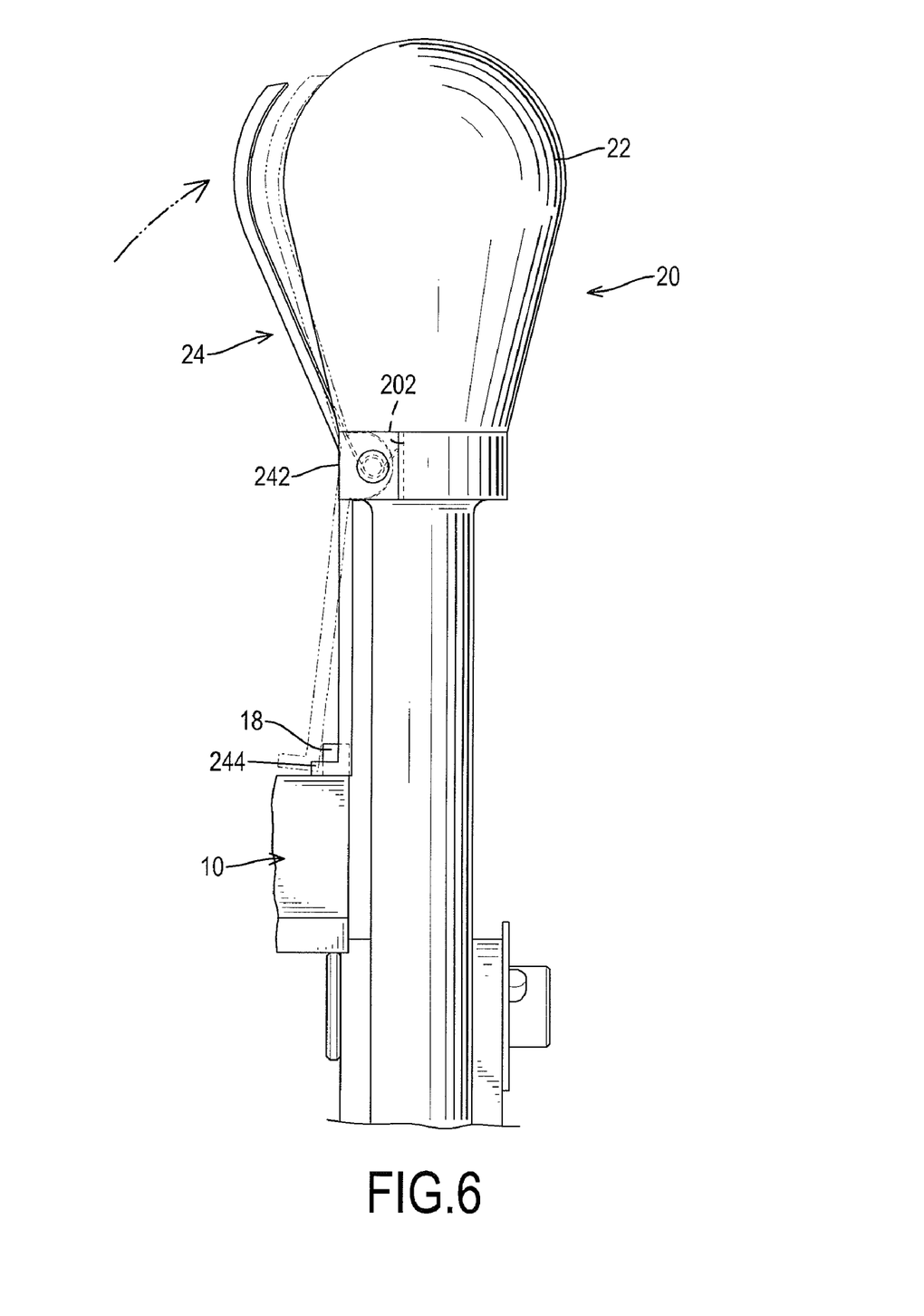
FIG. 6 is an enlarged operational side view of the safety device of the connector in FIG. 1.

With reference to FIGS. 2, 3 and 6, the safety device is mounted between the body 10 and the handle 20 to keep the handle 20 from being pivoted relative to the body 10 unintentionally. The safety device comprises an engagement block 18, a locking element 24 and a torsion spring 26. The engagement block 18 is mounted on and protrudes from the body 10 and is curved. Preferably, the engagement block 18 may be separated from the body 10. The locking element 24 is mounted pivotally on the handle 20 with a pivoting pin 25.

Preferably, the locking element 24 is mounted pivotally on the handle 20 at a side facing the body 10. To mount the locking element 24 pivotally on the handle 20, a pivotal cavity 202 is defined in the handle 20 and has an inner surface. At least one pivoting tab 242 is formed on the middle of the locking element 24 and is held in the pivotal cavity 202 in the handle 20. The pivoting pin 25 is mounted through the pivotal cavity 202 in the handle 20 and the at least one pivoting tab 242 on the locking element 24 to pivotally connect the locking element 24 with the handle 20. The locking element 24 has a top corresponding to the grip 22 of the handle 20, a bottom and a locking tab 244. The locking tab 244 is formed on and protrudes laterally from the bottom of the locking element 24 and selectively engages and abuts with the engagement block 18. Alternatively, the locking element 24 may be mounted on the handle 20 at a side opposite to the body 10, and the locking tab 244 may be mounted through the handle 20 and abut with the engagement block 18.

The torsion spring 26 is mounted around the pivoting pin 25 and has two ends abutting respectively with the handle 20 and the locking element 24. Preferably, one end of the torsion spring 26 abuts with the inner surface of the pivotal cavity 202 in the handle 20. Accordingly, the torsion spring 26 provides a force to the locking element 24 to keep the locking tab 244 on the bottom of the locking element 24 abutting with the engagement block 18 and the top of the locking element 24 away from the grip 22 of the handle 20.

With the abutment between the locking tab 244 of the locking element 24 with the engagement block 18 on the body 10, the handle 20 can be kept from being pivoted relative to the body 10. To pivot the handle 20 relative to the body 10, a user holds the grip 22 of the handle 20 with one hand to inherently push the top of the locking element 24 to abut the grip 22 of the handle 20 to pivot the locking element 24 relative to the handle 20. With the pivotal rotation of the locking element 24, the locking tab 244 of the locking element 24 can disengage from the engagement block 18, such that the handle 20 can be pivoted relative to the body 10. Because the engagement block 18 is separated from the body 10, the locking tab 244 may move over and disengage from the engagement block 18 even when the locking tab 244 is moved toward the body 10. After the user releases the grip 22 of the handle 20, the locking element 24 is pivoted relative to the handle 20 with the force provide by the torsion spring 26 to make the locking tab 244 engage and abut with one end of the engagement block 18 automatically. With the abutment between the locking tab 244 of the locking element 24 with the engagement block 18 on the body 10, the handle 20 can be kept from being pivoted relative to the body 10, and the connector can be prevented from detached from the oil drain valve to improve the safety of the oil-draining process.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the teems in which the appended claims are expressed.

What is claimed is:
1. A connector comprising:
 a body having
  two ends;
  a mounting tube formed on one end of the body and adapted to connect to an oil drain valve mounted on an underground oil depot;

a connection tube mounted on the other end of the body and adapted to connect to an oil pipe; and
a sealing ring mounted in the mounting tube;
a handle pivotally mounted on the body;
a transmission device pivotally connected to the handle and comprising
a linking lever having a first end pivotally connected to the handle and a second end; and
two transmitting levers pivotally and slidably connected to the second end of the linking lever;
two locking arms pivotally mounted on the mounting tube of the body, selectively extending into the mounting tube and respectively connected securely to the transmitting levers, with each locking arm having a pushing protrusion mounted on the locking arm and adapted to push against a joint on the oil drain valve; and
a safety device mounted between the body and the handle and having
an engagement block mounted on and protruding from the body and being curved;
a locking element mounted pivotally on the handle with a pivoting pin and having a locking tab formed on an end of the locking element and selectively engaging and abutting with the engagement block; and
a torsion spring mounted around the pivoting pin and having two ends abutting respectively with the handle and the locking element.

2. The connector as claimed in claim 1, wherein
the locking element is mounted pivotally on the handle at a side facing the body and has
a top;
a bottom on which the locking tab is formed;
a middle formed between the top and the bottom of the locking element; and
at least one pivoting tab formed on the middle of the locking element;
the handle further has a pivotal cavity defined in the handle and holding the at least one pivoting tab of the locking element inside and having an inner surface;
the pivoting pin is mounted through the pivotal cavity in the handle and the at least one pivoting tab on the locking element to pivotally connect the locking element with the handle; and
one end of the torsion spring abuts with the inner surface of the pivotal cavity in the handle.

3. The connector as claimed in claim 2, wherein
the handle is pivotally mounted on the body at a position adjacent to the connection tube and has a triangular shape, a top and a grip formed on and protruding from the top of the handle; and
the top of the locking element corresponds to the grip of the handle.

4. The connector as claimed in claim 1, wherein
the connection tube and the body are separate parts and are connected with each other with fasteners; and
the body further has
a transparent window tube mounted between the connection tube and a corresponding end of the body and having two ends respectively connected to the connection tube and the corresponding end of the body; and
two O-rings mounted respectively between the ends of the window tube and the connection tube and the corresponding end of the body.

5. The connector as claimed in claim 1, wherein
each transmitting lever has an elongated hole defined through the transmitting lever; and
the transmission device further has a sliding pin mounted slidably through the elongated holes in the transmitting levers and mounted through the second end of the linking lever.

6. The connector as claimed in claim 1, wherein
the locking arms are mounted respectively on two ends of a diameter of the mounting tube; and
the mounting tube further has
two pairs of pivotal ears mounted respectively on the ends of the diameter of the mounting tube, with each pair of the pivotal ears separately formed on and protruding from an outer surface of the mounting tube and having two pivoting holes defined respectively through the pair of the pivotal ears and aligning with each other;
two pivotal rods respectively connected securely with the transmitting levers, mounted respectively through the pivoting holes in the pairs of the pivotal ears and respectively mounted securely through the locking arms; and
two notches defined through the outer surface of the mounting tube respectively between the pairs of the pivotal ears.

7. The connector as claimed in claim 1, wherein
each locking arm has a pivotal recess defined in an edge of the locking arm and having a bottom; and
the pushing protrusion of each locking arm is pivotally mounted in the pivotal recess in the locking aim with a pivotal pin and has a bottom face and a gap defined between the bottom face of the pushing protrusion and the bottom of the pivotal recess.

8. The connector as claimed in claim 7, wherein
the locking element is mounted pivotally on the handle at a side facing the body and has
a top;
a bottom on which the locking tab is foamed;
a middle formed between the top and the bottom of the locking element; and
at least one pivoting tab formed on the middle of the locking element;
the handle further has a pivotal cavity defined in the handle and holding the at least one pivoting tab of the locking element inside and having an inner surface;
the pivoting pin is mounted through the pivotal cavity in the handle and the at least one pivoting tab on the locking element to pivotally connect the locking element with the handle; and
one end of the torsion spring abuts with the inner surface of the pivotal cavity in the handle.

9. The connector as claimed in claim 8, wherein
the handle is pivotally mounted on the body at a position adjacent to the connection tube and has a triangular shape, a top and a grip formed on and protruding from the top of the handle; and
the top of the locking element corresponds to the grip of the handle.

10. The connector as claimed in claim 9, wherein
the connection tube and the body are separate parts and are connected with each other with fasteners; and
the body further has
a transparent window tube mounted between the connection tube and a corresponding end of the body and having two ends respectively connected to the connection tube and the corresponding end of the body; and two O-rings mounted respectively between the ends of the window tube and the connection tube and the corresponding end of the body.

11. The connector as claimed in claim 10, wherein
each transmitting lever has an elongated hole defined through the transmitting lever; and
the transmission device further has a sliding pin mounted slidably through the elongated holes in the transmitting levers and mounted through the second end of the linking lever.

12. The connector as claimed in claim 11, wherein
the locking arms are mounted respectively on two ends of a diameter of the mounting tube; and
the mounting tube further has
two pairs of pivotal ears mounted respectively on the ends of the diameter of the mounting tube, with each pair of the pivotal ears separately formed on and protruding from an outer surface of the mounting tube and having two pivoting holes defined respectively through the pair of the pivotal ears and aligning with each other;
two pivotal rods respectively connected securely with the transmitting levers, mounted respectively through the pivoting holes in the pairs of the pivotal ears and respectively mounted securely through the locking arms; and
two notches defined through the outer surface of the mounting tube respectively between the pairs of the pivotal ears.

\* \* \* \* \*